3,228,986
BORON-CONTAINING COMPOUNDS
John A. Dupont and Marion F. Hawthorne, Huntsville, Ala., assignors to Rohm & Haas Company, Philadelphia, Pa., a corporation of Delaware
No Drawing. Filed Mar. 24, 1961, Ser. No. 98,261
9 Claims. (Cl. 260—606.5)

This invention concerns compounds formed by the reaction of decaborane adducts, $B_{10}H_{12} \cdot X_2$, in which X is selected from the group consisting of $CH_3CN$, $(CH_3)_2S$ and $(C_2H_5)_2S$, and diacetylene. More particularly, it concerns high boron content compounds which have high energy characteristics which can be used as such in propellants or as intermediates in the preparation of polymerizable high energy monomers.

The field of boron chemistry, particularly the chemistry of the reactions of the higher boron hydrides, such as decaborane, is so new that the nomenclature for many of the compounds has not yet been definitely fixed. However, chemists working in this new field have definitely agreed that the reaction product formed by the interaction of a decaborane adduct such as bis(acetonitrile) decaborane, $B_{10}H_{12} \cdot 2CH_3CN$, and acetylene produces carborane with the formula $$C_2B_{10}H_{12}$$

This being the case, then $$C_2B_{10}H_{11}-$$

is the carboranyl radical and $$-C_2B_{10}H_{10}-$$

is the carboranylene radical. Carboranylacetylene has the formula $$HCB_{10}H_{10}C-C \equiv CH$$

or $$H-\theta-C \equiv CH$$

in which the symbol $-\theta-$ is the radical $-C_2B_{10}H_{10}-$. This nomenclature has been used throughout the specification and in the claims.

The compounds of the present invention are useful as components of propellant compositions, either as such or when further reacted to incorporate polymerizable groups into the molecule.

Carboranylacetylene is prepared by reacting under anhydrous conditions bis(acetonitrile) decaborane, dissolved in dry acetonitrile, with a solution of diacetylene in acetonitrile. Prior to the addition of the diacetylene, the system is flushed with an inert gas, such as nitrogen, helium or argon, and the inert atmosphere is maintained in the reaction vessel during the addition of the diacetylene. The solution of bis(acetonitrile)decaborane in acetonitrile is maintained at reflux during the addition, and the addition of approximately two moles of diacetylene to two moles of bis(acetonitrile)decaborane requires 45 to 60 minutes. The solution is then refluxed for 4 to 6 hours. The reaction mixture is then evaporated to a syrup, washed with aqueous sodium hydroxide solution, and extracted with several portions of a low boiling aliphatic hydrocarbon, such as pentane. After evaporation of the pentane solution to approximately one-half of its original volume, the crude pentane solution is passed through a bed of basic alumina to remove the colored impurities. This solution is concentrated to about one-tenth its original volume and the small amount of white solid impurity is removed by filtration. The filtrate is evaporated to dryness, yielding a waxy white solid, carboranylacetylene, which has a melting point of 60° to 70° C.

The ratio of diacetylene to bis(acetonitrile)decaborane (hereinafter referred to as "BAND") is not critical, and, although an excess of either reactant can be employed, an excess of BAND of the order of 25% can be employed without adversely affecting the nature of the reaction or the yield of the products. In general, a 1 to 1 or a 1 to 1.25 molar ratio of diacetylene to BAND is employed, since the excess BAND can be easily recovered.

It is not recommended that the refluxing period after addition of the diacetylene exceed 4 to 6 hours, since it is noted that a decrease in yield is obtained on prolonged heating.

The passage of the solution of crude carboranylacetylene through an absorbent, such as basic alumina, is particularly important if the carboranylacetylene is to be employed as an intermediate in the preparation of biscarborane. The preparation of biscarborane and derivatives thereof is described in a co-filed application, Serial No. 98,263, filed on even date herewith.

Other inert solvents, i.e. solvents which do not react with the reactants or the reaction products, can be used, but acetonitrile is the preferred solvent. As long as BAND or acetonitrile is present, however, other inert solvents such as benzene, toluene or xylene can be used.

Diacetylene, $HC \equiv C-C \equiv CH$, was prepared using the method of Armitage et al., J. Chem. Soc. 44 (1951) and this method of preparation is incorporated herein by reference. The method comprises the dehydrochlorination of 1,4-dichlorobutyne-2 with potassium hydroxide in dioxane solution.

Although there are numerous adducts of decaborane which will react with diacetylene to yield carboranylacetylene, the preferred adduct is the bis(acetonitrile) adduct, $B_{10}H_{12} \cdot (CH_3CN)_2$, commonly referred to as "BAND." This adduct can be prepared by the method of Schaeffer as set forth in J. Amer. Chem. Soc. 79, 1006 (1957) and this method of preparation is incorporated herein by reference.

Other adducts which can be employed are the dialkyl sulfide addition products or the general formula $$B_{10}H_{12} \cdot 2R_2S$$

in which R is preferably methyl or ethyl.

Carboranylacetylene is prepared by the reaction of diacetylene with BAND. The molar ratios can be varied and can be from 1.5 to 1 to 1 to 1.5. A slight molar excess of BAND is preferred. The preferred ratio is 1 to 1.25. The excess can be easily removed from the product and can be re-used if desired.

The preferred solvent for the reaction is acetonitrile and it is preferred to dissolve the BAND in acetonitrile and add the diacetylene, dissolved in acetonitrile, incrementally to the BAND solution. The reaction mixture is maintained at reflux, but depending on the solvent being used, the reaction temperature can be from 30° to 120° C. The preferred range is from 80° to 100° C.

The reaction time will vary depending on the particular solvent being used, but is in the range of 4 to 6 hours. Using acetonitrile as solvent under refluxing conditions, the reaction time was 4 hours after the addition of the diacetylene solution had been completed.

The reaction mixture is evaporated to a syrup, washed with dilute sodium hydroxide and extracted with a lower boiling alkane, such as pentane. It was found that if this pentane solution, after drying over a desiccant, was passed through a column of basic alumina, any color bodies therein were removed. The pentane solution was concentrated to about one-tenth of its original volume, and, on cooling, a small amount of biscarborane precipitated. The residual solution was evaporated to dryness, yielding carboranylacetylene.

Biscarborane can be prepared in a similar fashion to carboranylacetylene by using 2 to 2.5 moles of BAND to 1 mole of diacetylene. However, low yields of biscarborane are obtained by this method of preparation.

Peculiarly, it has been found that if carboranlyacetylene, after isolation from the reaction mixture as described hereinbefore, is treated with 1 to 1.5 moles of BAND, a good yield of high purity biscarborane is obtained. The carboranylacetylene was dissolved in acetonitrile using 600 to 1200 ml. of acetonitrile per mole of carboranylacetylene and the BAND was added to this solution. This mixture was refluxed for 15 to 24 hours. On cooling to room temperature, the product crystallized from the solution and was removed by filtration. Any excess BAND in the product was removed by dissolving the product in benzene and removing the undissolved BAND by filtration. Concentration and further purification of the solution gave substantially pure biscarborane.

As set forth hereinbefore, carboranylacetylene and its derivatives are valuable as components of propellant compositions. A typical formulation is as follows:

| Component: | Percent by weight |
| --- | --- |
| Ammonium perchlorate | 70.0 |
| Carboranylacetylene | 10.0 |
| Carboranyl methyl acrylate | 10.0 |
| TEGDN [1] | 10.0 |
| Benzoyl peroxide | 1.0 |

[1] TEGDN is triethylene glycol dinitrate.

This composition was cast into motor casings and cured for ten hours at 80° C. The physical properties were good and the case bonding was excellent. The burning rates were 1.18 in./sec. at 500 p.s.i. and 1.70 in./sec. at 1000 p.s.i.

The "acetylenic" hydrogen in carboranylacetylene is an "active" hydrogen, and readily forms the Grignard reagent by reaction of carboranylacetylene with an alkyl magnesium halide in an inert solvent. The prefered solvent is diethyl ether, and alkyl group is generally lower alkyl and the halide is the bromide or iodide, with the bromide being preferred. Carboranylacetylene magnesium bromide behaves in the conventional manner, and reacts with a wide variety of compounds.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

*Preparation of carboranylacetylene.*—To a well-stirred refluxing suspension of 375 grams (1.87 moles) of bis-(acetonitrile)decaborane, in 1.5 liters of dry acetonitrile, was added under nitrogen, a solution of 94.4 grams (1.89 moles) of diacetylene in 300 ml. of dry acetonitrile. The addition was carried out over a forty-five minute period after which the solution was refluxed for approximately four hours (the reaction solution was refluxed one hour after becoming homogeneous). The solution was stripped to a syrup using a rotary evaporator, treated with 500 cc. of 10% sodium hydroxide and extracted three times with 500–700 ml. portions of pentane. The combined pentane extracts were dried over anhydrous magnesium sulfate and concentrated to about one-half their original volume. This slightly yellow pentane solution was passed through a bed of basic alumina and the resulting colorless solution was concentrated to 200 ml. The white solid (biscarborane, 12 grams) which appeared was filtered off and washed with a small amount of pentane. The filtrate was evaporated to dryness yielding 110 grams (35%) of carboranylacetylene, a waxy solid of M.P. 63–70° C. Repeated recrystallization from pentane at −80° C. afforded a material of M.P. 75–78° C.

*Analysis.*—Calculated for $B_{10}H_{12}C_4$: B, 64.27; C, 28.54; H, 7.20. Found: B, 62.22; C, 28.70; H, 7.70.

We claim:
1. A process for the preparation of carboranylacetylene

$$H-\theta-C\equiv CH$$

in which $-\theta-$ is the radical $-C_2B_{10}H_{10}-$ which comprises reacting at a temperature of from 30° C. to 120° C. the bis(acetonitrile) adduct of decarborane, of the formula $B_{10}H_{12}\cdot 2CH_3CN$, with diacetylene in the presence of a solvent which is inert under the reaction conditions and recovering the carboranylacetylene so formed.

2. A process as set forth in claim 1 in which the molar ratio of diacetylene to bis(acetonitrile) adduct of decaborane is from 1.5 to 1 to 1 to 1.5.

3. A process as set forth in claim 1 in which the molar ratio of diacetylene to bis(acetonitrile) adduct of decaborane is from 1 to 1.25.

4. A process as set forth in claim 1 in which the reaction temperature is in the range of 80° to 100° C.

5. A process as set forth in claim 1 in which the inert solvent is selected from the group consisting of benzene, toluene, xylene and acetonitrile.

6. A process as set forth in claim 1 in which the inert solvent is acetonitrile.

7. A process as set forth in claim 1 in which the preparation is carried out under anhydrous conditions.

8. A process as set forth in claim 1 in which the preparation is carried out in an inert atmosphere selected from the group consisting of nitrogen, helium and argon.

9. Carboranylacetylene of the formula $$HC_2B_{10}H_{10}-C\equiv CH$$

No references cited.

TOBIAS E. LEVOW, *Primary Examiner.*

LEON D. ROSDOL, CARL D. QUARFORTH,
*Examiners.*